United States Patent
Brown et al.

(10) Patent No.: US 7,309,384 B2
(45) Date of Patent: Dec. 18, 2007

(54) METHOD AND APPARATUS FOR FILTERING GAS WITH A MOVING GRANULAR FILTER BED

(75) Inventors: Robert C. Brown, Ames, IA (US); Corey Wistrom, Ames, IA (US); Jerod L. Smeenk, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 462 days.

(21) Appl. No.: 10/487,130

(22) PCT Filed: Aug. 21, 2002

(86) PCT No.: PCT/US02/26569

§ 371 (c)(1),
(2), (4) Date: Aug. 3, 2004

(87) PCT Pub. No.: WO03/018173

PCT Pub. Date: Mar. 6, 2003

(65) Prior Publication Data

US 2005/0016377 A1    Jan. 27, 2005

Related U.S. Application Data

(60) Provisional application No. 60/314,103, filed on Aug. 22, 2001, provisional application No. 60/388,201, filed on Jun. 12, 2002.

(51) Int. Cl.
*B01D 46/32* (2006.01)
(52) U.S. Cl. .............................. 95/275; 55/474; 55/479
(58) Field of Classification Search .................. 95/274, 95/275, 276, 107, 108; 96/150, 152; 55/478, 55/479, 474
See application file for complete search history.

(56) References Cited

U.S. PATENT DOCUMENTS 3,800,516 A * 4/1974 Paluch ........................ 96/150
3,940,237 A * 2/1976 Gonzalez et al. ............. 55/474

(Continued)

FOREIGN PATENT DOCUMENTS

EP        0 399 416 A    11/1990

(Continued)

OTHER PUBLICATIONS

Brown, Shi, Colver and Soo; Simiulitude study of a moving bed granular filter, Department of Mechanical Engineering, Iowa State University Sep. 17, 2003.
Ethan Brue, and Robert C. Brown, Use of Pressure fluctuations to validate hydrodynamic similitude in fluidized media: bubbling bed; Center for Sustainable Environment, Iowa State University; Oct. 24, 2000.

(Continued)

*Primary Examiner*—Duane Smith
*Assistant Examiner*—Robert A Clemente

(57) ABSTRACT

A method and apparatus for filtering gas (58) with a moving granular filter bed (48) involves moving a mass of particulate filter material (48) downwardly through a filter compartment (35); tangentially introducing gas into the compartment (54) to move in a cyclonic path downwardly around the moving filter material (48); diverting the cyclonic path (58) to a vertical path (62) to cause the gas to directly interface with the particulate filter material (48); thence causing the gas to move upwardly through the filter material (48) through a screened partition (24, 32) into a static upper compartment (22) of a filter compartment for exodus (56) of the gas which has passed through the particulate filter material (48).

16 Claims, 3 Drawing Sheets

U.S. PATENT DOCUMENTS

| | | | |
|---|---|---|---|
| 4,203,736 A * | 5/1980 | Berz | 95/276 |
| 4,324,570 A | 4/1982 | Pforr et al. | |
| 5,238,659 A * | 8/1993 | Tajiri et al. | 55/479 |
| 5,653,181 A * | 8/1997 | Yang et al. | 96/152 |
| 6,440,198 B1 * | 8/2002 | Yang et al. | 95/275 |

FOREIGN PATENT DOCUMENTS

| | | |
|---|---|---|
| JP | 58114711 | 7/1983 |
| JP | 2001 129338 A | 5/2001 |
| JP | 2001129338 A * | 5/2001 |

OTHER PUBLICATIONS

Detamore, Swanson, Frender, and Hrenya; A kinetic-theory analysis of the scale-up of circulating fluidized beds; Department of Chemical Engineering, University of Colorado, Aug. 20, 2000.

Brown and Brue; Resolving dynamical features of fluidized beds from pressure fluctuations; Center of Sustainable Environmental Technologies, Iowa State University, Jun. 15, 2000.

Brown and Colver; Control of Interfacial Dust Cake to Improve Efficiency of Moving Bed Granular Filters; Center of Sustainable Environmental Technologies, Iowa State University, Oct. 31, 2002.

* cited by examiner

METHOD AND APPARATUS FOR FILTERING GAS WITH A MOVING GRANULAR FILTER BED

CROSS REFERENCE TO A RELATED APPLICATION

This application is based upon Provisional Patent Application Ser. No. 60/314,103 filed Aug. 22, 2001 and Provisional Patent Application Ser. No. 60/388,201 filed Jun. 12, 2002.

GRANT REFERENCE

Work for this invention was funded in part by a grant from the United States Department of Energy, Contract No. DE-FG26-99FT40588. The government may have certain rights in this invention.

BACKGROUND OF THE INVENTION

Counterflow of gas and particles is highly desirable in moving bed granular filters to achieve high dust removal efficiency from contaminated gas streams. In counterflows the dirty entering gas is scrubbed by the dirtiest particles and the clean exiting gas is scrubbed by the cleanest particles. However, moving bed granular filters that utilize counterflow typically have a low gas throughput to prevent bed material from leaving the filter when the minimum fluidization velocity of the granules is exceeded.

A disadvantage of the cyclonic flow of the gas is a disturbance of granules and collected dust at the interface between the gas and granular bed. Momentum transfer from the cyclonic gas flow imparts a swirling flow to the granules and collected dust, which makes the flow through the filter non-uniform and adversely imparts filtration efficiency.

The lack of durable, low-cost filters to clean high temperature gas streams is one of the primary obstacles to commercial introduction of advanced power systems based on coal and biomass. The two most promising filtration systems being investigated by government and industry are ceramic barrier filters and moving bed granular filters.

Ceramic barrier filters have several disadvantages: they must be periodically regenerated (blow back) to remove accumulated dust; they are fragile; and they are expensive.

Moving bed granular filters have been developed in several different geometries. These can be roughly characterized as parallel flow, counterflow, and crossflow filters. Parallel flow of gas and particles results in clean gas disengaging from dust-laden granules. Under these circumstances, dust can be entrained with the gas, which reduces the dust collection efficiency of the filter. Crossflow filters require very complicated tuyeres to inject dirty gas into the moving bed of granules. These are expensive and do not fully solve the dust carryover problem of gas disengagement.

Moving bed granular filters operate on the principle that a flowing bed of particles can effectively scrub particulate contaminant from a gas stream. Although very promising for achieving high filtration efficiencies, the relatively large footprint of the equipment and high throughputs of granular material as filter media are cited as drawbacks to moving bed granular filters.

It is therefore a principal object of this invention to incorporate these novel design features: A tangential gas inlet, a flow straightening section at the interface between entering gas and the granular bed, a screened gas disengagement section, and a diamond shaped insert.

These and other objects will be apparent to those skilled in the art.

SUMMARY OF THE INVENTION

The design of this invention consists of four main features: a tangential gas inlet, a flow straightening section; a gas disengagement section as shown in FIG. 1, and a diamond shaped insert to enhance filter material flow. The gas enters the filter through a tangential gas inlet, which imparts a cyclonic motion to the gas flow.

The filter of this invention employs a counterflow of gas and particles, which substantially eliminates the problem of dust carryover in the gas disengagement region. Upward flowing gas can fluidize the granular bed at sufficiently high flow velocities, which greatly reduces filter efficiency and must be avoided. In the instant design, this problem is eliminated by use of a screen at the disengagement interface between the exiting gas and the granular bed. The screen prevents the bed from expanding; thus, it is not able to fluidize. With the screen in place, the gas flow rate through the filter is increased by as much as 67%, which translates to smaller, more economical filters.

Another advantage of the filter of this invention compared to other moving bed filter designs is the use of a tangential gas inlet, which reduces pressure drop through the filter. Traditional gas inlets inject gas perpendicularly through the side of the filter housing, which results in a large irreversible loss of gas momentum. The tangential inlet converts linear momentum of the gas flow into a cyclonic flow. The preserved momentum of the gas reduces pressure drop by 28-45% compared to a conventional perpendicular gas inlet.

In an alternate design, a diamond-shaped insert is in the lower region of the housing to change the media flow pattern, which enhances the performance of the filter.

DESCRIPTION OF THE PREFERRED EMBODIMENT

Figure 1:
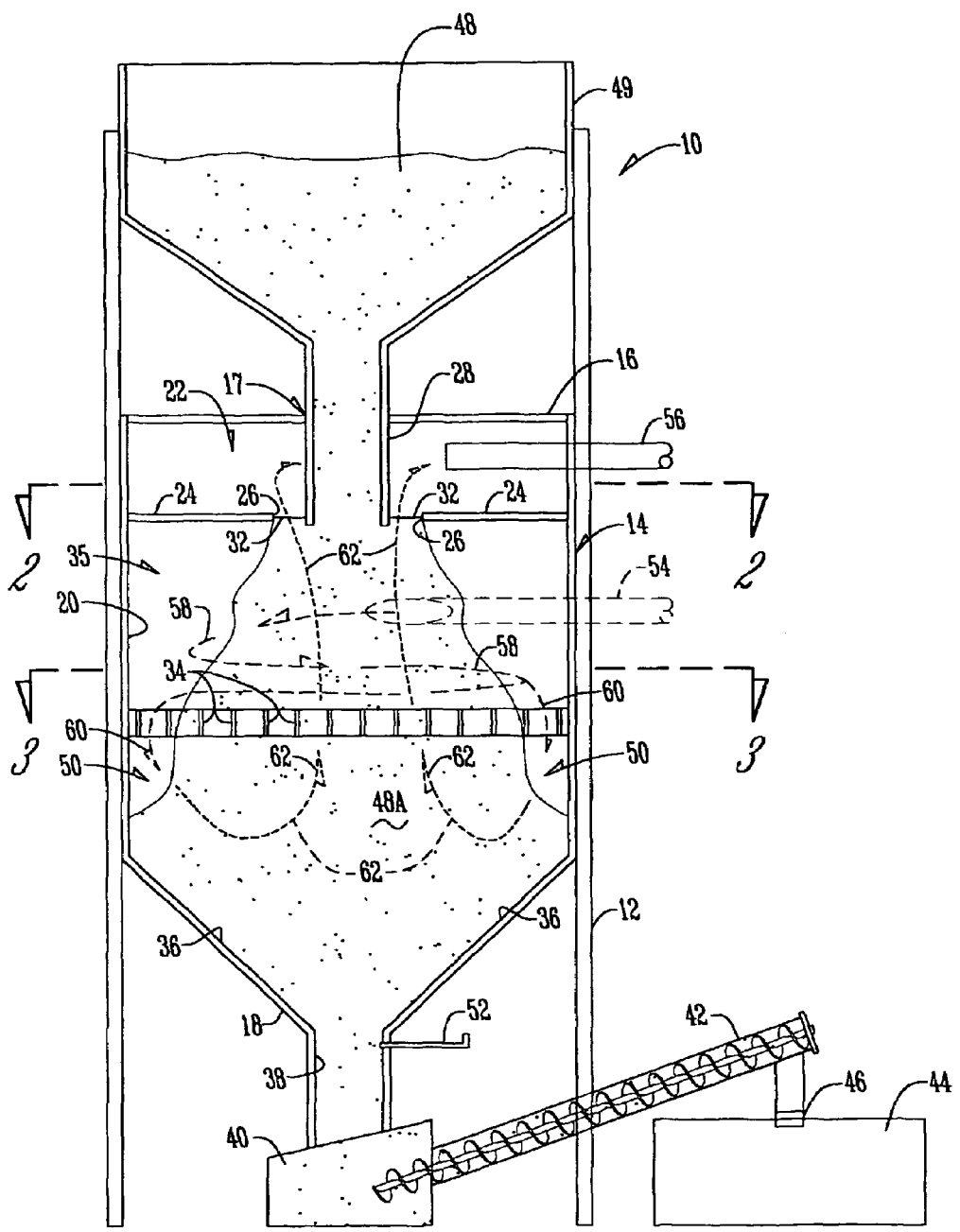
FIG. 1 is a schematic vertical sectional view through the filter system of this invention.
Figure 2:
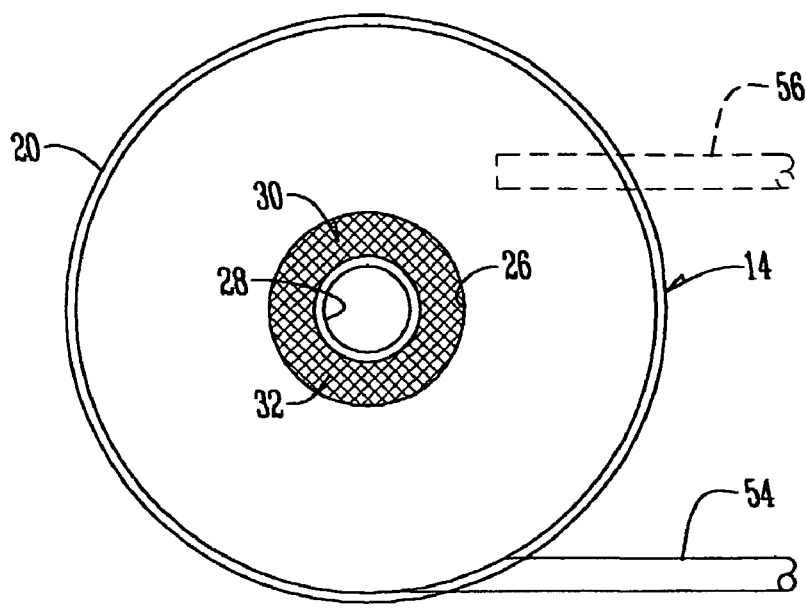
FIG. 2 is an enlarged scale sectional view taken on line 2-2 of FIG. 1.

With reference to FIG. 1 the filter assembly 10 has a conventional supporting frame 12 which supports a filter compartment 14 which is cylindrical in shape. The filter compartment has a top 16 with a center opening 17, a bottom 18, and cylindrical side walls 20. An upper compartment 22 serves as a gas disengagement region and has a bottom partition 24 with a center opening 26 directly below center opening 17 in top 16. A vertically disposed hollow particle inlet conduit 28 extends downwardly through the center opening 17 of top 16 as well as through the opening 26 in bottom partition 24 (FIG. 2). The opening 26 in bottom partition 24 is sufficiently large to provide a circular space 30 around inlet conduit 28 (FIG. 2). A screen mesh 32 extends over space 30 and is connected to bottom partition 24 in any convenient manner.

A plurality of radially disposed horizontal fins 34 are located in the gas engagement section 35 of filter compartment 14 at a level below the lower end of the inlet conduit 28. The bottom 18 of filter compartment 14 has tapered bottom conical side walls 36 which terminate at the lower end thereof in exit port 38. Port 38 is sealed to auger boot 40. A sealed auger assembly 42 is conventionally connected to auger boot 40 in a sealed manner, and conventionally extends upwardly and outwardly therefrom. The upper end of the auger assembly 40 is in sealing engagement with a conventional residue container 44 by means of a sealed but detachable connection 46.

In FIG. 1, a filter material 48 is placed in supply bin 49 which is in connection with the upper end of inlet conduit 28. The numeral 48A (FIG. 1) designates an inverted conically-shaped pile or mass of the filter material which has entered the gas engagement section 35 through the inlet conduit 28. While the shape and size of the mass 48A may vary in size and shape during the operation of the filter assembly 10, it will always be sufficiently broad at its upper end to cover the complete area of the screen mesh 32. It typically will extend downwardly below the radial fins 34 to create a gas engagement section 50 where the gas interfaces with the surface of the filter material 48. It should also be noted that a sufficient quantity of the filter material 48 completely fills the bottom of a filter compartment 14. The material in exit port 38, boot 40, and in auger assembly 42 effectively seals the bottom of the filter compartment to prevent the escape of any gas material through those components. A valve 52 in the bottom of the filter compartment is available for selective access into the filter compartment from the bottom as maintenance or the like may require.

A horizontally disposed gas inlet 54 is tangentially secured to the filter compartment 14 at a level below the bottom partition 24 of the upper compartment 22. A horizontal gas inlet pipe 56 extends outwardly from upper compartment 22 and serves to exit filtered gas from the upper compartment 22 as will be described hereafter.

It should be understood that the filter material 48, which is granular in nature and which will be described hereafter is continuously flowing downwardly through the filter compartment 14. The material is not free falling through the filter, for its downward movement is controlled and is restricted by the auger assembly 42 which determines and regulates the discharge of the filter material from the filter compartment 14.

In operation, gas under pressure is introduced into the gas engagement section 35 through inlet 54 after the filter material 48 has sufficiently filled the filter compartment 14 to the extend completely under screen 32 as shown in FIG. 1. Again, it is important to note that the filter material at that point in time covers the lower surface of screen 32 to prevent any gas material from flowing from the inlet 54 directly into the upper compartment 22 through the screen 32. The arrows 58 designate the general cyclonic path of the injected gas from inlet 54 around the surface of the conical shaped pile 48. This cyclonic path is created by virtue of the tangential location and direction of the gas inlet 54. As the gas approaches the fins 34, the cyclonic path of the gas is interrupted and is changed to a vertical direction as indicated by the arrows 60. It is within the engagement section 50 that the gas interfaces with the filter material 48 and begins to migrate upwardly through the conical shaped pile or mass of filter material 48A as indicated by the arrows 62. The upwardly moving gas through the material 48A will not penetrate the inlet conduit 28 because of the weight and downward movement of the filter material moving downwardly therethrough. Rather, the gas will proceed to the area of least resistance which causes it to move upwardly through the screen 32 into the upper compartment 22. The gas is cleansed by the filter material as it moves upwardly against the downwardly flow of the filter material. Thus, the gas entering the upper compartment 22 and exiting through the conduit 56 is substantially cleaner than the gas that was entering the gas inlet 54.

The three main features of the preferred embodiment of this invention, i.e., a tangential gas inlet, a flow straightening section, and a gas disengagement section are shown in FIG. 1.

Inside the filter compartment 14, the gas flows swirls downward towards the interface between the gas and granular bed (see arrows 58 in FIG. 1). By imparting cyclonic flow, the momentum of the gas is preserved, reducing pressure drop normally associated with sudden expansion into a filter. However, bed granules and accumulated dust cake on the surface of the bed would be disturbed unless the radial component of the gas flow is redirected axially before it reaches the bed surface. The gas is redirected by a flow straightening fins 34 above surface of the bed, which consists of sixteen evenly spaced fins distributed circumferentially in the annular space. The fins 34 effectively redirect the radial momentum of the flow axially downward (arrow 60) onto the gas-solid contacting or engagement region 50. The flow-straightening region 50 effectively distributes the gas flow over the surface of the bed, which is important to the efficient utilization of the filter media. It is at this gas/solid interface that much of the gas cleaning takes place: dust particles entrained in the gas flow impact on granules, where they are effectively captured. The accumulation of dust particles on the granules and in the voids between granules forms a thin dust cake, which further aids in the capture of dust particles in the gas flow.

The gas flows upward (arrows 62) through the granular material, which is moving downward as a moving bed. This counterflow of gas and granules means that the dirty gas engages the bed where the granules are the dirtiest while clean gas disengages the bed where the granules are the cleanest. This counterflow results in very efficient gas cleaning.

The gas disengagement region (upper compartment 22) consists of a central pipe 28 that feeds granular material to the top of the moving bed and an annular region 35 where clean gas exits the bed through a screen. As previously indicated, gas does not flow into the inlet conduit 28 by virtue of the large gas flow resistance in that direction. Gas flowing upward in the upper compartment 22 around the feed pipe tends to expand the bed against the screen, which prevents the moving bed from transitioning to a fluidized bed even at very high gas flow rates. This constraint is important because a fluidized bed would not be as efficient as a moving bed for dust collection.

As gas flows through the filter, the granular bed is continuously flowing downward under the force of gravity. The granular bed flow rate is controlled using either the slide gate (valve 52) positioned at the bottom of the unit, or the auger boot 40 and auger assembly 42 as described above.

Certain tests were conducted to determine the feasibility of the invention. For the tests described here, all parts were constructed from ¼" thickness polycarbonate plexiglass to give a clear view of bed fluid dynamics. The part dimensions and shapes are listed in Table 1 below:

TABLE 1

Size and Shape of Design Parts

| Part | Size and Shape |
| --- | --- |
| Gas Inlet 54 | 4" × 4" OD tube |
| Filter Compartment 14 | 12" × 4" OD tube |
| Upper Compartment 22 | 8" × 4" OD tube |
| Fins 34 | ¾" × 3" rectangle |
| Inlet Conduit 28 | 4" × 4" OD tube |
| Gas Exit 56 | 4" × 4" OD tube |

Sixteen fins were evenly spaced around the gas disengagement section. The granular bed consisted of washed 4-mm diameter soda-lime glass beads assumed to be perfectly spherical. Household window screen was stretched between the inlet conduit 28 and gas disengagement section (upper compartment 22) to prevent fluidization of the granular bed. Air at 70° F. simulated the gas to be cleaned in the model filter. All parts were welded together using standard plexiglass solvent.

Other parts used in these tests include a sealed funnel, slide gate, and a 5-gallon container. The granular bed material was stored above the filter compartment in the funnel where it flowed downwardly into the granular inlet conduit by gravity. It then flowed into the gas disengagement section and through the slide gate valve into the 5-gallon container.

The main purpose of the above tests was to establish gas and granular flow characteristics of the filter assembly. In addition to visual observations of the granular flow, pressure drop in the gas flow between the gas inlet and gas exit was measured as a function of incremented superficial gas velocities. For the purposes of these tests, superficial velocity was defined as the volumetric flow rate divided by the cross sectional area of the annular interfacial area where inlet gas engages the moving bed. Bed depth, cross-sectional flow area, granular size and density, and gas travel distance were kept constant in these tests.

The pressure drop was recorded at each superficial gas velocity using three Magnahelix differential pressure gauges (2, 5, and 10 in. $H_2O$). Three differential pressure gauges were used to increase recording accuracy at different gas flow rates. A vertical, in-line 0-606 ft/min (0-100 SCFM) rotameter, corrected for temperature and pressure, was used to measure volumetric flow rate of air. Prior to each test, the differential pressure gauges and rotameter were calibrated at zero to ensure accurate measurements.

Triplicate measurements were performed for superficial gas velocities between 0 to 606 ft/min in increments of 30 ft/min. At each gas flow rate, the granular bed material was allowed to flow for five minutes to reach steady state before the gas flow rate, differential pressure, and visual observations of moving bed behavior were recorded.

It was hypothesized that the formation of dust cake to be important for efficient dust collection, the entering gas flow must not disrupt the interfacial area between bed and gas. This was accomplished by letting granules flow out of a solids downcomer (inlet conduit) to spread out into a large, conical interface. Dirty gas flows downward through this interface, depositing dust, and then turns to flow upward through the downward flowing granular bed.

The gas disengagement region (upper compartment) also required a special configuration to allow high gas flows through the filter. The upward flowing gas induced a drag on the granules that causes the bed to expand and eventually fluidize, an undesirable behavior that limits gas throughput through the filter. A gas disengagement section (upper compartment) consisting of a small diameter feeder tube conveying granular material to a larger diameter was used. At low gas velocities, the granules from the feeder tube spread out into a conical pile. However, at high gas velocities, these particles expanded upward against an annular porous plate or screen that prevented their continued expansion. The screen allowed gas to exit the filter while retaining granular material. Gas did not enter the feeder tube by virtue of the large gas flow resistance in that direction.

The filter was constructed from 6.35 mm thick polycarbonate plexiglass to give a clear view of bed fluid dynamics. The body of the filter was 19.8 cm dia., the downcomer (inlet conduit) was 14.2 cm dia., and the feeder tube was 10.2 cm dia. The feed hopper (49) provided fresh granular material to the top of the filter. A discharge barrel, which was sealed against the atmosphere, accepted dust-laden granular material from the bottom of the filter. Air at 20° C. simulated the gas to be cleaned in the filter. The granular bed is comprised of washed 4-mm diameter soda-lime glass beads assumed to be perfectly spherical. The granular bed flow rate was controlled with a slide gate at the bottom of the filter. Bed depth, cross-sectional flow area, granular size and density, and gas travel distance were kept constant in these tests.

As previously indicated, a rotameter, corrected for temperature and pressure, was used to measure volumetric flow rate of air up to 2.8 m3/min. Pressure drop was recorded at each superficial gas velocity using three Magnahelic differential pressure gauges (5, 12.7, and 25.4 mm $H_2O$). Three differential pressure gauges were used to increase recording accuracy at different gas flow rates. Triplicate measurements were performed for superficial gas velocities between 0-3.1 mls in increments of 0.15 m/s. At each gas flow rate, the granular bed material was allowed to flow for five minutes to reach steady state before the gas flow rate, differential pressure, and visual observations of the moving bed were recorded. In some experiments, titanium oxide smoke was injected into the air flow to visualize gas entering the filter and obtain a qualitative indication of filtration efficiency.

Qualitative observations were made on the behavior of granular material moving through the downcomer as a function of superficial gas velocity, which is defined as the volumetric flow rate divided by the cross sectional area of the annular region formed between the filter body and the inlet conduit. The filter was tested both with and without the retaining screen installed above the disengagement section. Observations on the behavior of the granular bed in the presence and absence of the screen are recorded in Tables A and B. Without the screen, granules at the surface of the bed in the disengagement section become agitated with increasing superficial velocity and eventually elutriate from the filter. It was estimated that the maximum operating velocity to be 0.9 mls without a retaining screen. When the screen was installed above the disengagement section, the granules expand against the screen but were not able to fluidize. It was estimated that the maximum operating velocity to be 1.5 m/s. The screen increased gas throughput by 67% compared to the filter operated without the screen.

TABLE A

Performance of downcomer with retaining screen in disengagement section

| Superficial gas velocity (m/s) | Observations of downcomer flow |
| --- | --- |
| 0-0.3 | Smooth downward granular bed flow with no fluidization. |
| 0.3-0.6 | Smooth downward granular bed flow. Bed material begins to expand upward. |

TABLE A-continued

Performance of downcomer with retaining screen in disengagement section

| Superficial gas velocity (m/s) | Observations of downcomer flow |
|---|---|
| 0.6–0.9 | Smooth downward granular bed flow. Full expansion of the bed with the upper region becoming fully fluidized. |
| >0.9 | Material in top half of downcomer fully fluidized; granular material entrained elutriated through the gas exit. |

TABLE B

Performance of downcomer without retaining screen in disengagement section

| Superficial gas velocity (m/s) | Observations of downcomer flow |
|---|---|
| 0–0.5 | Smooth downward granular bed flow with no fluidization. |
| 0.5–0.8 | Smooth downward granular flow. Bed beginning to expand against screen with slight fluidization on top. |
| 0.8–1.5 | Smooth downward granular flow. Full expansion against the screen with no fluidization present. |
| >1.5 | Top half of granular bed in downcomer is stationary and fully expanded against screen while bottom half becomes fluidized. |

By increasing gas throughput, the overall size of the filter is decreased resulting in reduced costs associated with manufacturing the unit. At the same time, the low pressure drop decreases the operating costs by reducing the energy required by a blower to move gas through the filter. Furthermore, even distribution of gas at the interface between entering gas and the granular bed assures that granules of bed material and dust collected on the granules is not disturbed, which would adversely impact filtration efficiency.

The gas throughput with and without the screen installed in the disengagement section of the filter was measured. Without the screen, the maximum gas flow occurred when the moving bed began to fluidize. With the screen installed, the maximum gas flow occurred when gas flow in the lower region of the bed became turbulent and disrupted the smooth downward flow of granules. As indicated, the screen increased gas throughput by 67% compared to the filter operated without the screen. Observations on the behavior of the granular bed in the presence and absence of the screen are recorded in Tables 2 and 3.

Without the screen, granules at the surface of the bed in the disengagement section become agitated with increasing fluidization velocity and eventually blowout of the filter. It is estimated that the maximum operating velocity to be 182 ft/min with a screen. When a screen was installed in the disengagement section, the granules expanded against the screen but were not able to fluidize. The maximum operating velocity was estimated to be 303 ft/min.

TABLE 2

Granular Bed Effects in Gas Disengagement Section Without Screen

| Superficial Gas Velocity (ft/min) | Granular Bed Effects |
|---|---|
| 0–61 | Smooth downward granular bed flow with no fluidization. |
| 91–121 | Smooth downward granular bed flow. Beginning to expand to top of gas disengagement flow. |
| 152–182 | Smooth downward granular bed flow. Full expansion of the bed with the uppermost regions becoming fully fluidized. |
| >182 | Top half of bed fully fluidized; granular material entrained and blown out of the filter. |

TABLE 3

Granular Bed Effects in Gas Disengagement Section with Screen

| Superficial Gas Velocity (ft/min) | Granular Bed Effects |
|---|---|
| 0–91 | Smooth downward granular bed flow with no fluidization. |
| 121–152 | Smooth downward granular bed flow. Bed beginning to expand against screen with slight fluidization on top. |
| 182–303 | Smooth downward granular bed flow. Full expansion against the screen with no fluidization present. |
| >303 | Top half of granular bed is stationary and fully expanded against screen with bottom half becoming fluidized. |

The two types of inlets investigated were a conventional gas inlet entering perpendicularly to the body of the filter and a gas inlet entering tangentially to the body of the filter with flow straightening fins. Both configurations employed screens in the disengagement sections. Pressure loss was significantly less for the tangential inlet than for the perpendicular inlet. At the maximum operable superficial gas velocity of 303 ft/min the pressure loss for the tangential inlet was 44% less than for the perpendicular inlet.

The momentum of the gas was better conserved using the tangential gas inlet. When the gas entered through the tangential gas inlet, the momentum of the horizontally flowing gas was efficiently converted to cyclonic flow in the body of the filter. On the other hand, when the gas was injected perpendicularly into the filter, the gas lost momentum as the flow is rearranged.

As previously indicated, in tests with the tangential inlet, flow-straightening fins were employed just above the gas engagement section to prevent scouring of the interfacial region of the bed, as subsequently described. Pressure loss was significantly less for the tangential inlet than for the perpendicular inlet. At the maximum operable superficial gas velocity of 1.5 m/s the pressure loss for the tangential inlet was 44% less than for the perpendicular inlet.

The behavior of granules at the surface of the moving bed where gas entered was observed as a function of superficial velocity. Observations for the perpendicular and tangential gas inlets are recorded in Tables 4 and 5, respectively.

TABLE 4

Gas-Solid Contacting Region Effects Using
Perpendicular Gas Inlet and Screen

| Superficial Gas Velocity (ft/min) | Gas-Solid Contacting Region Effects |
|---|---|
| 0-182 | Interface is smooth with no scouring present. |
| 212-303 | Interface becomes scoured on side opposite of gas inlet indicating uneven gas distribution. |

TABLE 5

Gas-Solid Contacting Region Effects using Tangential
Gas Inlet, Screen, and Fins

| Superficial Gas Velocity (ft/min) | Gas-Solid Contacting Region Effects |
|---|---|
| 0-303 | Interface is smooth with no scouring present. |
| >303 | Gas is evenly distributed as granular interface becomes slightly scoured completely around gas disengagement section. |

For the perpendicular inlet, the gas flow appeared to be uniformly distributed over the granular bed interface up to superficial velocity of 182 ft/min. However, above this velocity, the interface of the bed on the side opposite of the inlet was strongly scoured, with granules violently tossed about. On the other hand, the tangential inlet showed uniform gas distribution at velocities as high as 303 ft/min.

High momentum gas entering the perpendicular inlet was not able to smoothly negotiate the downward turn and becomes concentrated at a point on the surface of the bed immediately opposite the inlet, the scouring effect showed how the gas was unevenly distributed over the gas-solid contact region. On the other hand, the tangential inlet combined with flow straightening fins, efficiently turns the flow and distributes it over the granular bed interface.

Although the tangential inlet greatly reduces pressure drop in the filter, the cyclonic flow scours the surface of the granular bed, disrupting the formation of dust cake deposited by entering gas. The fins which were installed in the annular space formed below the inlet conduit did straighten gas streamlines flowing downward toward the engagement section of the granular bed. Qualitative observations were made of the bed surface as a function of superficial gas velocity for perpendicular and tangential gas inlets and recorded in Tables C and D, respectively.

TABLE C

Behavior of granules at bed interface
with no fins in gas engagement region

| Superficial gas Velocity (m/s) | Gas-solid contacting region observations |
|---|---|
| 0-0.9 | Gas engagement interface is smooth with no scouring. |
| 0.9-1.5 | Interface becomes scoured on side opposite of gas inlet. |

TABLE D

Behavior of granules at bed interface
with fins in gas engagement region

| Superficial gas Velocity (m/d) | Gas-solid contacting region observations |
|---|---|
| 0-1.5 | Gas engagement interface is smooth with no scouring. |
| >1.5 | Gas is evenly distributed with little scouring. |

The counterflow moving bed granular filter design handles a high gas throughput and produces a low-pressure drop while evenly distributing the gas over the gas-solid contacting region. These effects are achieved by using three main design features: a tangential gas inlet, a flow straightening section, and a screened gas disengagement section. The cold flow tests indicate that these design features can improve the performance of moving bed granular filters.

DESCRIPTION OF ALTERNATE EMBODIMENT

Figure 3:
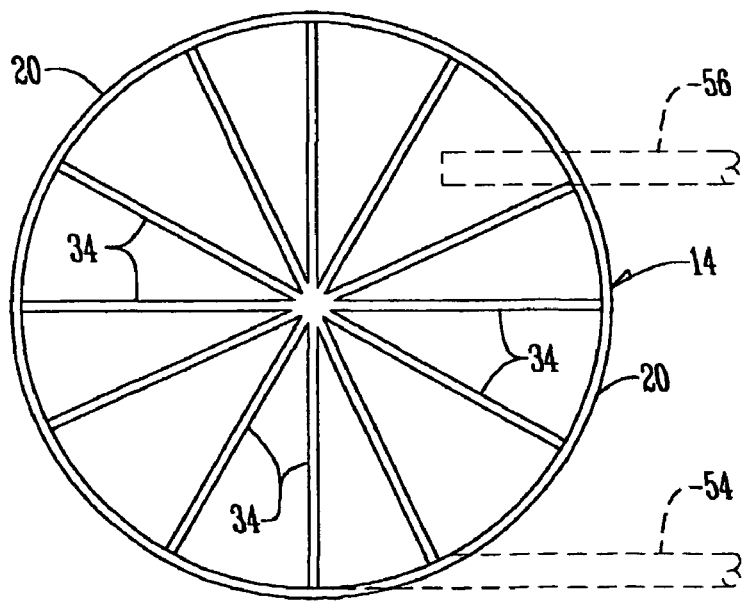
FIG. 3 is an enlarged scale sectional view taken on line 3-3 of FIG. 1.
Figure 4:
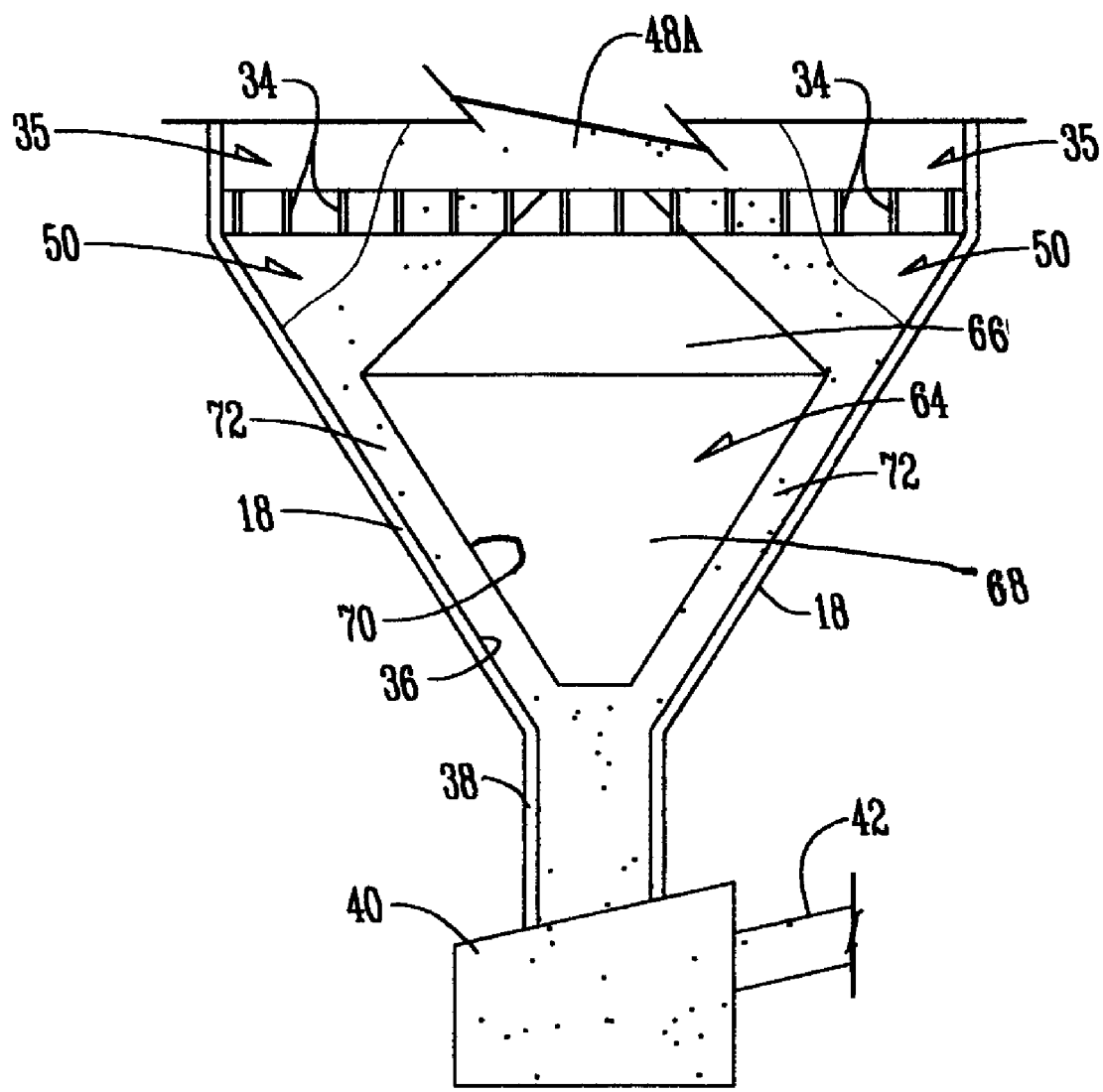
FIG. 4 is a view similar to that of FIG. 1, but shows an alternate embodiment of the invention.

FIG. 4 shows an alternate form of the invention which includes essentially the same structure contemplated by FIGS. 1-3, except that a diamond shaped insert 64 supported generally on fins 34 in the configuration of a plumb bob has an inverted conical shaped top 66 and a conical shaped bottom 68 with side walls 70. The side walls 70 are spaced from the sidewalls 36 of bottom 18 to provide a conical shaped material passageway 72. The shape of the insert 64 creating the passageway 72 beneficially changes the media flow pattern, which enhances the flow and performance of the filter material 48. It also serves to reduce the change of the media in the filter which reduces start up time. More specifically, the presence of the diamond-shaped insert 64 serves to encourage mass flow of the filter media, thereby directing the filter media to the gas/media interfacial region 50. Exchange of clean filter media for dirty filter media in the interfacial region 50 is critical for high efficiency filtration.

Among the advantages of the embodiments of the present invention are the following:

1. The disengagement section 22 employs a screen 32 to prevent the free expansion of the granular bed 48A. This constraint prevents the bed 48A from fluidizing, which would otherwise limit the maximum gas flow rate through the filter.

2. With use of flow-straightening fins 34, the tangential gas inlet 54 provides a low-pressure drop as the gas enters a moving bed granular filter. This reduces pumping costs and provides a more energy efficient filter.

3. With use of flow-straightening fins 34 in combination with the tangential gas inlet 54, the gas is evenly distributed over the gas-solid contacting region. This maximizes gas-granule contact time and provides even utilization of the granular bed.

4. The use of the diamond shaped insert 64 serves to beneficially change the media flow pattern, which enhances the flow of the filter material 48.

It is therefore seen that this invention will accomplish at least all of its stated objectives.

We claim:

1. A method for filtering gas with a moving granular filter bed, comprising, providing a cylindrical filter compartment having a top, bottom, and cylindrical side walls, providing an upward compartment portion below the top of the filter compartment, and having a bottom portion with an opening therein, providing a conduit extending through the top of the filter compartment and through the opening in the bottom partition of the upper compartment portion, providing that the opening in the bottom partition of the upper compartment is sufficiently large to create a space around the hollow conduit, providing a screen mesh for covering the space around the hollow conduit, providing a gas engagement portion in the cylindrical filter compartment which has a diameter greater than the space around the hollow conduit to receive a quantity of filter material moving through the hollow conduit, passing a quantity of particulate filter material through the hollow conduit and into the gas engagement portion of the cylindrical filter compartment, restraining the vertical flow of particulate filter material downwardly through the gas engagement portion sufficiently to create a quantity of filter material sufficient to engage the entire area of the screen mesh, introducing a jet of horizontal gas tangentially into the gas engagement portion to direct gas in a cyclonic direction around the moving granular filter material in the gas engagement portion, and providing a gas exit port in the upper compartment portion to permit the exit of gas therefrom which has migrated through the particulate filter material in the gas engagement portion, thence through the screen mesh, and thence into the upper compartment.

2. The method of claim 1 wherein the particulate filter material is comprised of particles which are spherical in shape.

3. The method of claim 2 wherein the particulate material is comprised of soda-lime glass beads.

4. The method of claim 3 wherein the soda-lime glass beads are approximately 4-mm in diameter.

5. The method of claim 1 wherein the particulate material is comprised of soda-lime glass beads.

6. The method of claim 1 wherein the cyclonic path of the gas through the gas engagement section is diverted to a downwardly vertical flow towards the bottom of the filter compartment.

7. The method of claim 1 wherein a baffle element having a diamond shape with tapered side walls in a lower portion thereof is suspended in the lower portion of the filter compartment in spaced relation to tapered exterior walls of the filter compartment to provide a conically shaped passageway of the particulate material downwardly through the filter compartment.

8. The method of claim 1 wherein the vertical hollow inlet conduit is connected to a source of filter material sufficiently to have a quantity of moving filter material filling the hollow conduit as the material moves therethrough.

9. The method of claim 1 wherein the filter material in the bottom of the filter compartment is movably removed from the filter compartment without allowing any of the gas in the filter compartment to also exit the filter compartment.

10. A filter for biomass gasification, comprising, a cylindrical filter compartment having a top, bottom and cylindrical side walls, an upper compartment portion below the top of the filter compartment, and having a bottom partition with an opening therein, a vertical hollow conduit extending through the top of the filter compartment and the opening in the bottom partition of the upper compartment portion, the opening in the bottom partition of the upper compartment being sufficiently large to create a space around the hollow conduit, a screen mesh covering the space around the hollow conduit, a gas engagement portion in the cylindrical filter compartment having a diameter greater than the space around the hollow conduit to receive a quantity of filter material moving through the hollow conduit, and being sufficiently large to contain at least a conical-shaped pile of filter material flowing out of the hollow conduit sufficient to engage the entire area of the screen mesh, a substantially horizontal gas inlet port tangentially positioned on the gas engagement portion to direct gas into the interior of the gas engagement portion to direct gas in a cyclonic direction around an accumulation of moving granular filter material moving through the gas engagement portion, and a gas exit port in the upper compartment portion to permit the exit of gas therefrom which has entered the gas engagement portion, thence engaged and passed through the accumulation of moving filter material in the gas engagement portion, and thence through the screen mesh and into the upper compartment.

11. The filter of claim 10 wherein a plurality of vertically positioned radially extending fins are mounted in the gas engaging portion below the gas inlet port.

12. The filter of claim 10 wherein a baffle element having the shape of an inverted cone is suspended in the lower portion of the filter compartment in spaced relation to tapered exterior walls extending downwardly from the cylindrical walls of the filter compartment, and being located above in the bottom of the filter compartment.

13. The filter of claim 12 wherein a plurality of vertically positioned radially extending fins are mounted in the gas engaging portion below the gas inlet port.

14. The filter of claim 10 wherein the vertical hollow conduit is connected to a source of filter material sufficient to have a quantity of moving filter material filling the hollow conduit as it moves therethrough.

15. The filter of claim 10 wherein a sealed disposal means is located in the bottom of the filter compartment to receive filter material that has passed through the filter compartment.

16. The filter of claim 10 wherein means are provided at the bottom of the filter compartment for allowing filter material to exit therefrom without allowing gas within the filter material to exit the filter compartment.

* * * * *